Aug. 8, 1967

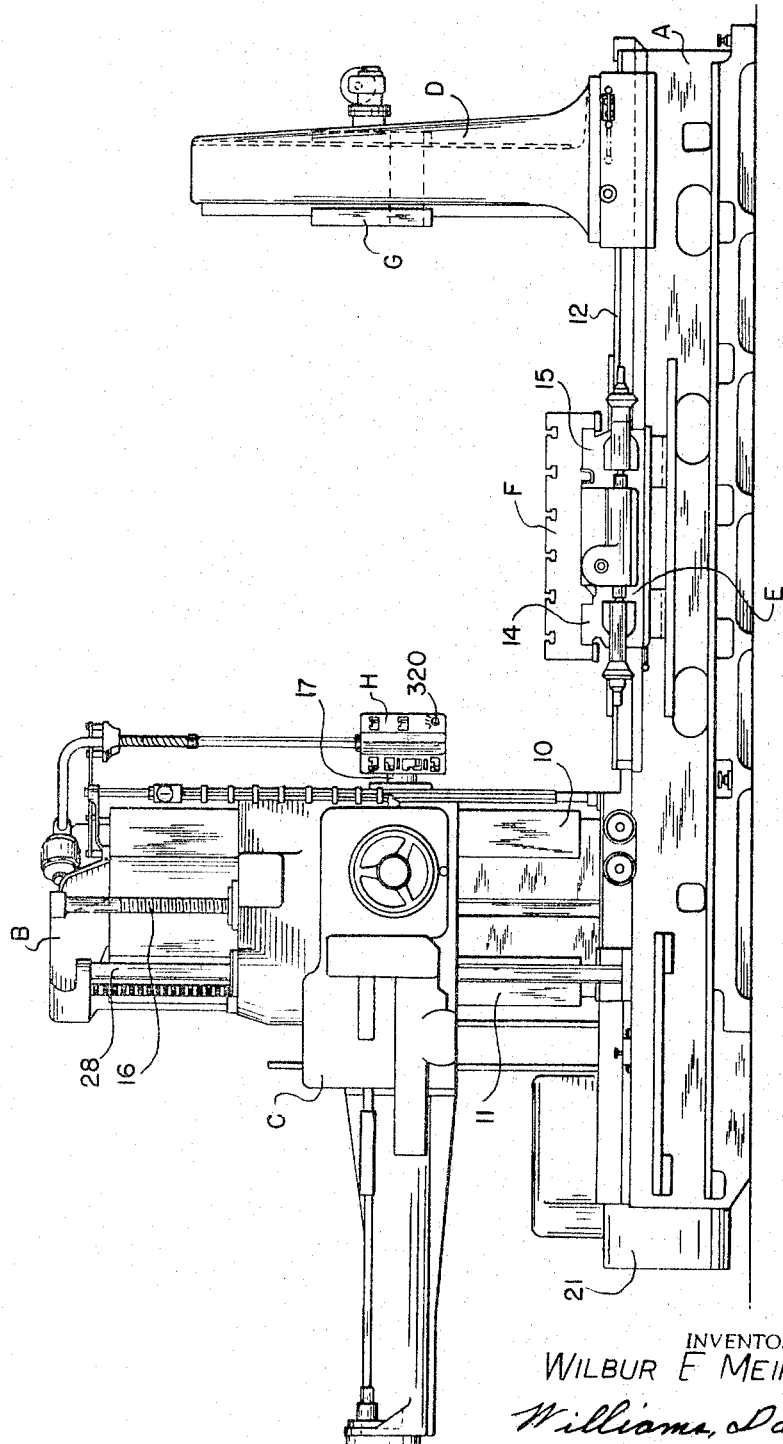

W. E. MEINKE 3,334,525

CHANGE SPEED TRANSMISSION

Filed Sept. 29, 1964

INVENTOR.
WILBUR E. MEINKE
BY Williams, David,
Hoffmann & Yount
ATTORNEYS

Aug. 8, 1967     W. E. MEINKE     3,334,525

CHANGE SPEED TRANSMISSION

Filed Sept. 29, 1964     5 Sheets-Sheet 4

INVENTOR.

BY WILBUR E. MEINKE

ATTORNEYS

INVENTOR.
WILBUR E. MEINKE

United States Patent Office 3,334,525
Patented Aug. 8, 1967

3,334,525
CHANGE SPEED TRANSMISSION
Wilbur E. Meinke, Fairview Park, Ohio, assignor to The New Britain Machine Company, New Britain, Conn., a corporation of Connecticut
Filed Sept. 29, 1964, Ser. No. 400,114
8 Claims. (Cl. 74—339)

The present invention relates to apparatus having a variable speed change transmission of the shifting or slidable gear type and more particularly to a machine tool having a variable speed change transmission and a control means for automatically and rapidly effecting speed changes when desired.

The principal object of the invention is the provision of a novel apparatus comprising a speed change transmission of the shifting gear type in which a speed change can readily be made while the driving gear is rotating and which comprises means for bringing a driven normally stationary gear between which the driving gear engagement is to be made to effect a speed change up to or approximately to the speed of the driving gear immediately prior to the gears being engaged so that the engagement can be made smoothly and rapidly.

Another object of the invention is the provision of a novel apparatus comprising a speed change transmission of the shifting gear type and more particularly a horizontal boring machine having in the spindle head a spindle speed change transmission of the type referred to comprising means for bringing a driven gear connected to the tool spindle up to or approximately to the speed of a driving gear to be engaged therewith immediately prior to the engagement of the gears so that the engagement can be made smoothly and rapidly.

The present invention resides in certain novel constructions, combinations and arrangement of parts and further objects and advantages thereof will be apparent to those skilled in the art to which the invention relates from the following description of the preferred embodiment thereof described with reference to the accompanying drawings, in which similar reference characters designate corresponding parts through the several views, and in which:

FIG. 1 is an elevational view of a horizontal boring, drilling and milling machine embodying the present invention;

Figure 5:
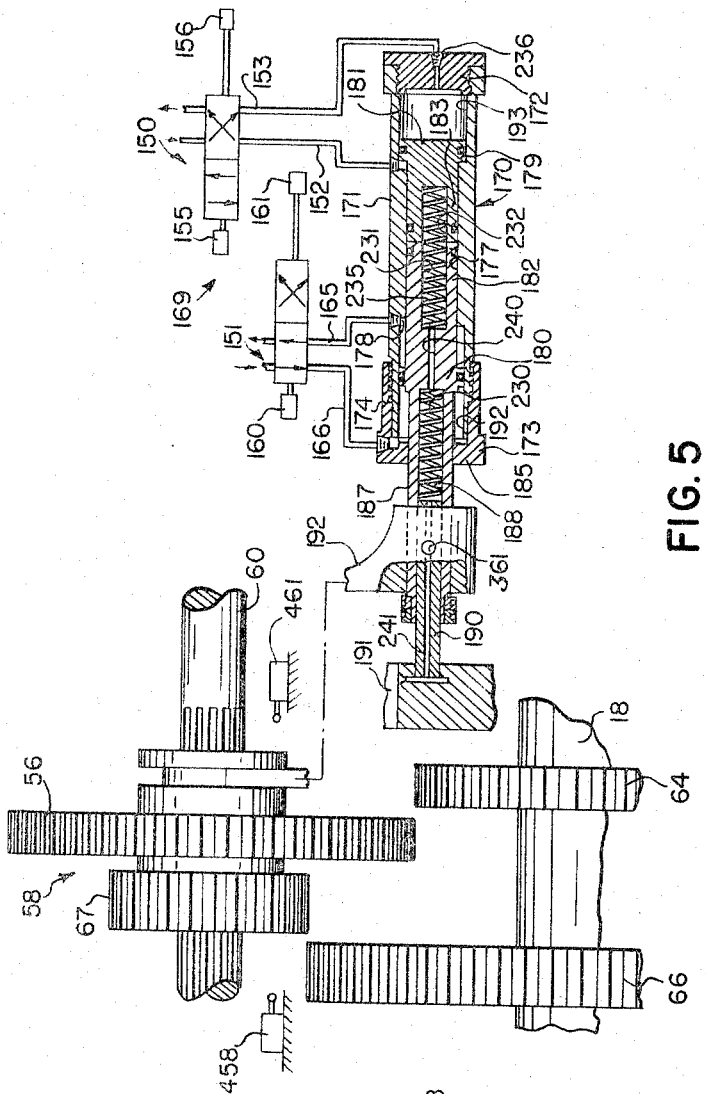
FIG. 5 is a view of an alternate mechanism which may be substituted for the mechanism shown in FIG. 4 for shifting the gear cluster referred to in FIG. 4.
Figure 2:
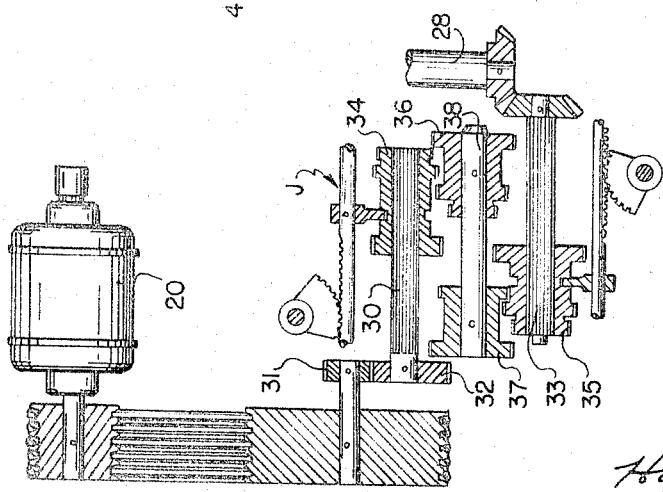
FIG. 2 is a diagrammatic view of that portion of the spindle speed drive transmission of the machine illustrated in FIG. 1 which is located within the machine bed.

The present invention may be embodied in various machines but is herein shown and described as embodied in a combined horizontal boring, drilling and milling machine.

Referring to the drawings, the machine shown therein comprises a base A, provided at one end with a spindle head column B formed with vertical ways 10 and 11 upon which a spindle head C is mounted for vertical movement, and at the other end with a back rest or outboard support column D slidably supported on horizontal ways 12 extending lengthwise of the bed. The ways 12 also support a saddle E having transverse horizontal ways 14, 15 on the upper side which in turn supports the worktable F. The backrest column is provided with vertical ways upon which a backrest block G is mounted for vertical movement.

The spindle head C is adapted to be moved vertically along the ways 10, 11 by a lead screw 16 rotatably supported in the machine in a suitable manner and having threaded alignment with a nut fixed in the spindle head. A tool spindle 17 is slidably supported within a spindle quill 18, the quill 18 in turn being rotatably supported within the spindle head C. The tool spindle 17 in addition to being rotatable in opposite directions is movable longitudinally of its axis of rotation at different speeds to effect both feed and rapid traverse movements. The machine shown is similar to that disclosed in Hallis N. Stephan's application, Ser. No. 205,479 entitled "Horizontal Boring, Drilling and Milling Machine," now Patent No. 3,139,000 and assigned to the same assignee as the present invention. The various operations and movements of the different elements of the machine are controlled from a pendant control station H and described and claimed in said application.

The spool spindle 17 is adapted to be rotated from a reversible driving motor 20 arranged for ceiling mounting and enclosed within a guard 21 adjacent to the left-hand end of the base of the machine through the medium of a speed change gear transmission, generally designated by the reference character J housed within a suitable gear box supported in the bed of the machine, a vertical shaft 28 the lower end of which is rotatably supported in the gear box while the upper end is rotatably supported in the head column B, and a variable change speed transmission, designated generally by the reference character K, located in the spindle head C. The motor 20 is connected to the driven shaft 30 of the speed change transmission J by a V-belt drive and spur gears 31 and 32, the former of which is fixed to a shaft carrying the driven pulley of the V-belt drive while the latter is fixed to the shaft 30. The driving shaft 33 of the transmission J is connected to the lower end of the vertical shaft 28 by miter gears. The speed change transmission J provides nine different speeds and comprises gear clusters 34, 35 slidably supported on the shafts 30 and 33 respectively and adapted to cooperate with gear clusters 36 and 37 fixed to an intermediate shaft 38.

The gear clusters 34 and 35 are adapted to be shifted lengthwise of the shaft 30 and 33 upon which they are slidably splined to obtain the various speeds by any suitable mechanism. The particular mechanism employed forms no part of the present invention per se and is not illustrated and described herein in detail.

Slidably splined to the shaft 28 is a bevel gear 40, which gear is rotatably supported within the spindle head C and movable vertically along the shaft 28 when the spindle head is moved in a vertical direction. In constant mesh with bevel gear 40 is bevel gear 42 fixed on a shaft 44 rotatably supported within the spindle head and extending perpendicular to the shaft 28. The shaft 44 additionally has fixed thereon a pair of spur gears 46 and 48. In constant mesh with the spur gear 48 is an idler gear 50, which gear is in turn in constant mesh with spur gear 52 fixed on a shaft 54 rotatably supported within the spindle head C and extending parallel to the spindle 17. In constant mesh with the spur gear 46 is one gear 56 of a two gear shiftable gear cluster 58. The gear cluster 58 is slidably splined to a splined shaft 60, which extends parallel to the spindle 17 and is rotatably supported within the spindle head C.

Figure 3:
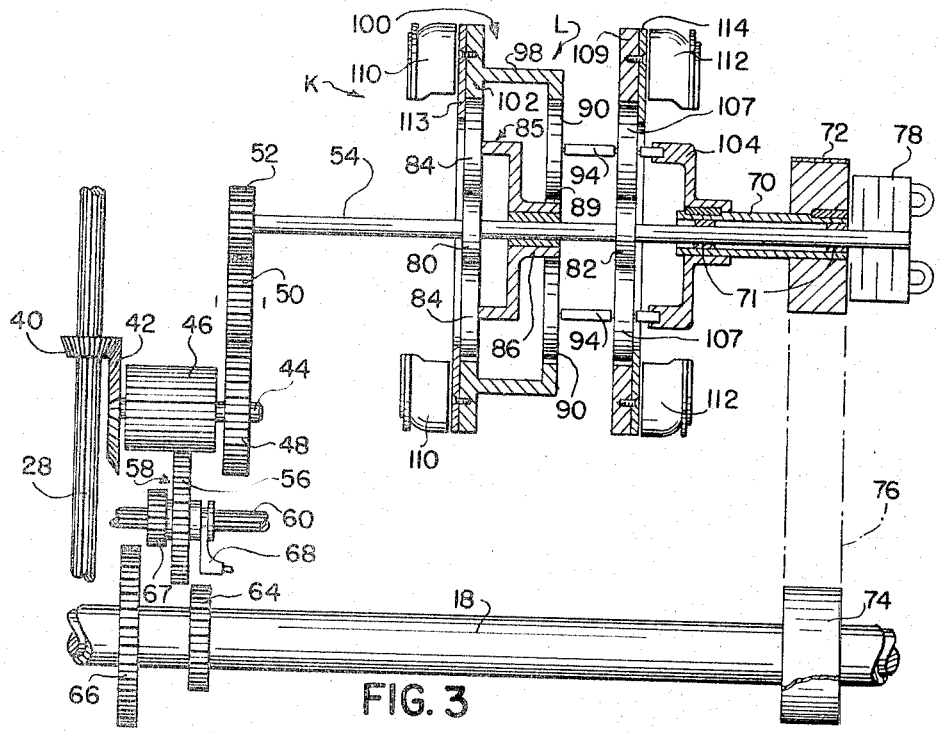
FIG. 3 is a diagrammatic view of that portion of the spindle drive transmission which is located within the spindle head of the machine.

The left end of the spindle quill 18, as viewed in FIG. 3, has operatively connected thereto or fixed thereon spaced apart spur gears 64 and 66, which gears are adapted to be driven when selectively engaged with one of the gears of the gear cluster 58. The gear 56 of the gear cluster 58 is adapted to be meshed with the gear 64 and the other gear 67 of the gear cluster 58 is adapted to be meshed with spur gear 66 when the gear cluster 58 is moved along the shaft 60 toward the right and left, respectively. The spur gear 46 has a width such that it will remain in mesh with the gear 56 when the gear cluster 58 is linearly moved along the shaft 60 to selectively engage the gears 64 and 66. When the gear cluster 58 is shifted or moved toward the left to engage gear 67 thereof with spur gear 66, a low speed spindle drive is effected and when the shift gear cluster 58 is shifted or moved toward the right to engage gear 56 thereof with spur gear 64, an intermediate speed spindle drive is effected.

Surrounding the right end portion of the shaft 54, as viewed in FIG. 3, is a sleeve 70. The sleeve 70 is coaxially and rotatably supported on the shaft 54 via suitable bearing 71. Keyed or otherwise secured to the right end of the sleeve 70 is a pulley 72. The pulley 72 is operatively connected to a pulley 74 fixed on the right end of the spindle quill 18 by a flexible V-belt drive 76. Secured to the shaft 54 adjacent the right end or side of the pulley 72 is an electrically energizable friction clutch 78 adapted to selectively interconnect the shaft 54 and the pulley 72 to provide a high speed drive of the spindle 17.

According to the present invention provision is made for rapidly and smoothly engaging either the gear 67 of the gear cluster 58 with the gear 66 on the spindle quill 18 to drive the spindle 17 at low speed or the gear 56 with the gear 64 to drive the spindle at a higher speed without necessarily interrupting the drive to the spindle head C, that is, while the gear 46 is rotating by bringing the peripheral speed of the respective gears fixed to the spindle quill to that or approximately that of the gears to be engaged therewith. The synchronization or approximate synchronization of the speeds of the gears is effected by a planetary gear drive, designated generally by reference character L, which is selectively operable to drivingly interconnect the shaft 54 and the sleeve 70 permanently connected to the spindle quill 18 by the belt drive 76 and thus rotate the sleeve 70 and in turn the spindle quill at either a desired first or low speed, or a desired second or intermediate speed.

The planetary gear drive comprises axially spaced apart sun gears 80 and 82 fixed to the shaft 54. In constant mesh with the sun gear 80 are a plurality of planet gears 84 rotatably connected to a spider member 85 having a hub 86 rotatably mounted on the shaft 54 intermediate the sun gears 80 and 82. Rigidly secured to or integrally formed with the right end of the hub 86 of the spider member 85 is a gear 89 having in constant mesh therewith a plurality of planet gears 90 rotatably secured to the left end of shafts 94. The planet gears 90 are also in constant mesh with a first internal orbit gear 98 of an orbit gear cluster, designated generally by reference numeral 100, and having a second annular internal orbit gear 102 in constant mesh with the planet gears 84. The planet gears 84 and 90 are of equal diameters as are the sun gears 80 and 89 and the orbit gears 98 and 102. The right ends of the shafts 94 are rigidly connected to a spider member 104 connected to the sleeve 70. Rotatably secured to the shafts 94 intermediate their ends are planet gears 107 which gears are in constant mesh with the sun gear 82 and an orbit gear 109.

Adjacent the annular left side portion of the orbit gear 98 and adjacent the annular right side portion of the orbit gear 109, as viewed in FIG. 3, are a plurality of annularly spaced electrically energizable magnetic brakes 110 and 112, respectively, which brakes are suitably supported within the spindle head. Suitable annular friction plates 113 and 114 are bolted or otherwise secured to the sides of the orbit gears 98 and 109, respectively, adjacent the magnetic brakes. The brakes 110 and 112 are selectively energizable to frictionally hold the orbit gears 98 and 109 stationary.

From the foregoing, it is apparent that when a drive is imparted to the shaft 54 the sleeve 70 will remain stationary unless the clutch 78 is engaged or one of the orbit gears 100 or 109 held stationary, since the planet gears 84, 90 and 107 are free to rotate on their respective shafts. To rotate the spindle quill 18 at a speed such that the peripheral speed of the spur gear 66 will be at a near synchronous speed with that of the gear 67 of the gear cluster 58, the magnetic brakes 110 are energized to hold the orbit gear cluster 100 stationary. By holding the orbit gear cluster 100 stationary, the planet gears 84 when rotated by the sun gear 80, are forced to "walk" around the orbit gear 98, that is, move in a circular path which is concentric with the axis of the gear 98. Since the planet gears 84 are carried by the spider or yoke member 85, rotation of the gear 89 is effected. Rotation of the gear 89 will in turn rotate planet gears 90 which gears will "walk" around the orbit gear 102, since the orbit gear 102 is also held stationary. The walking or circular movement of planet gears 90 is imparted to the sleeve 70 by the shafts 94 and the yoke or spider member 104. When the drive to the sleeve 70 is effected in this manner, the spindle quill 18, which is operatively connected to the sleeve 70 by V-belt drive 76, will be driven at a relatively low speed. When the spindle quill 18 is driven at this relatively low speed, the spur gear 66, which is connected thereto, will be driven such that its peripheral speed will be at a near synchronous speed to the peripheral speed of the gear 67 of the gear cluster 58. The gear cluster 58 is then adapted to be shifted toward the left, as viewed in FIG. 3, to engage the gear 67 with the gear 66 without clashing.

When it is desired to rotate the spindle quill at a speed such that the peripheral speed of the spur gear 64 will be at a near synchronous speed with that of the gear 56 of the gear cluster 58, the planetary brakes 112 are energized to hold the orbit gear 109 stationary. The drive from shaft 54 will then be through the sun gear 82 and the planet gears 107, which gears will "walk" around the orbit gear 109, rotating the spider 104, sleeve 70, pulley 72, belt 76, pulley 74, and in turn the spindle quill 18. When the spindle quill 18 is driven in this manner the spur gear 64 will be rotated such that its peripheral speed will be at a near synchronous speed to the peripheral speed of the gear 56 of the gear cluster 58. The gear cluster 58 is then adapted to be shifted or moved toward the right, as viewed in FIG. 3 to engage the gear 56 thereof with spur gear 64 carried by the spindle quill 18 without clashing.

In the embodiment shown the diameters of the sun gear 82, the planet gears 107 and the orbit gear 109 are the same as the diameters of the sun gears 80 and 89, the planet gears 84 and 90, and the orbit gears 98 and 102, respectively. It is thus apparent that when the orbit gear 109 is held stationary, a single speed reduction is effected as opposed to the double speed reduction effected when the orbit gear cluster 100 is held stationary. However, it will be understood that the size or diameters of the respective sun, planet and orbit gears employed may be varied to effect other speed reduction ratios corresponding to the chosen speed ratio of the low and intermediate speed spindle drives.

While in the embodiment illustrated in FIG. 3 only two planet gears are shown in connection with each orbit gear, it will of course be understood that more than two, and preferably three, planet gears will be employed.

Figure 4:
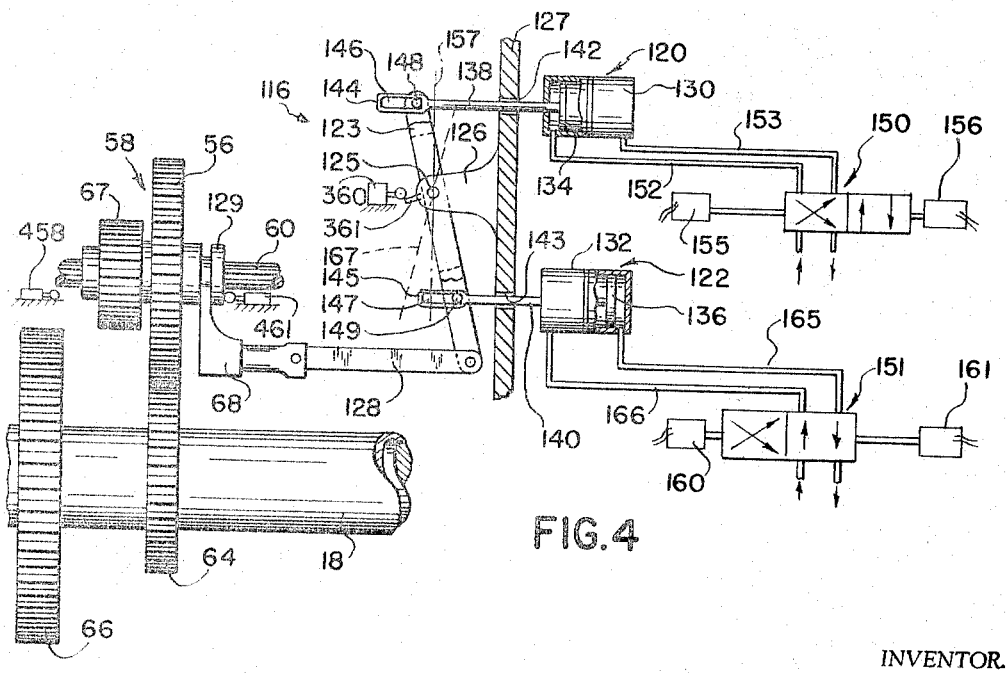
FIG. 4 is an enlarged diagrammatic view of the mechanism employed for shifting the movable gear cluster of the spindle drive transmission shown in FIG. 3.

FIG. 4 illustrates one power actuated mechanism 116 which may be employed for shifting or moving the gear cluster 58 along the shaft 60. The power actuated mechanism 116 is selectively operable to shift the gear cluster 58 between three different linear positions, i.e., a far right or intermediate speed position, which is the position in which the parts are shown in FIG. 4 and in which position the spur gear 56 of the gear cluster 58 engages the spur gear 64, a neutral position, which is the position shown in FIG. 3, and in which position the gears of the gear cluster 58 are located between the gears 64 and 66, and a far left or low speed position in which the gear 67 of the gear cluster 58 engages the spur gear 66.

The power actuated mechanism 116 comprises in general a pair of fluid operated, double acting reciprocating motors 120 and 122 which are operatively connected to a lever 123 at spaced apart locations thereon, the lever in turn being operatively connected to the yoke member 68. The lever 123 is pivotally connected by a pivot pin 125 midway between its connections with the fluid operated motors 120 and 122 to a bifurcated projection 126 mounted to or formed integral with a mounting plate or vertical wall 127 within the spindle head C. The opposite end portions of the lever 123 are bifurcated and the lower end thereof, as viewed in FIG. 4, is pivotally connected to one end of an arm 128 the other end of which is pivotally connected to the yoke member 68. The yoke member 68 is slidably supported within the spindle head C and includes an upwardly extending portion which engages within an annular recess 129 formed in the hub of the gear cluster 58.

The fluid motors 120, 122 comprise cylinders 130, 132 having closed ends and pistons 134, 136 slidably received therein, respectively. The pistons 134, 136 are rigidly connected to piston rods 138, 140, respectively, which project through apertures formed in the left end walls of the cylinders, as viewed in FIG. 4, and through apertures 142, 143 formed in the wall 127. Secured to the left ends of the piston rods 138, 140 are rectangularly shaped members 144, 145 having elongated generally rectangularly shaped slots 146, 147. The members 144, 145 are slidably connected to the bifurcated ends of the lever 123 by pins or bolts 148, 149 which extend transversely through the lever 123 and the slots 146, 147, respectively. The length of the slots are equal to one-half the length of the operating stroke of the fluid motors 120, 122 and effect a lost motion connection between the pistons 134, 136 and the lever 123, for purposes hereinafter described. The width of the slots are somewhat larger than the diameter of the pins 148, 149 so as to accommodate the arcuate movement of the pins when the lever 123 is pivoted.

The fluid motors 120, 122 are adapted to be supplied with a fluid, such as air, under pressure from any suitable source. Conventional solenoid operated valves 150, 151 are employed to control the flow of fluid to and from the motors 120, 122, respectively. Since both valves control the flow of fluid to their respective motors in the same manner, only solenoid operated valve 150 will be described.

The solenoid operated valve 150 is connected to the opposite ends of the fluid motor 120 by combined delivery and return conduits 152 and 153 and operates as a reversing valve for the flow of fluid to and from the opposite ends of the motor. The valve includes actuating solenoids 155 and 156 which are selectively energizable for producing the flow reversing functioning of this valve. The fluid returned from the motor 120 is exhausted to the atmosphere through the valve 150.

The arrangement of the power actuating mechanism, as illustrated in FIG. 4, is such that fluid motor 120 is actuated to move the gear cluster 58 from the neutral position to the intermediate speed position or vice versa and fluid motor 122 is actuated to move the gear cluster 58 from between the neutral position to the low speed position or vice versa. To move the gear cluster 58 from the intermediate speed position, illustrated in FIG. 4, to the neutral position, shown in FIG. 3, solenoid 156 is de-energized and solenoid 155 energized to reverse the flow of fluid through the valve 150 and supply pressure fluid via conduit 152 to the left end of the cylinder 120. The supply of pressure fluid to the left end of the cylinder 120 will cause the piston 134 and the piston rod 138 to move toward the right and exhaust the fluid contained within the right end of the cylinder to the atmosphere via conduit 153. Since the pin 148 was in engagement with the right end of the slot 146, the lever 123 will not begin to pivot clockwise until the left end of the slot engages the pin 148, which engagement does not take place until the piston 134 has gone through one-half of its operating stroke and is centrally positioned within the cylinder 130. Continued movement of the piston 134 toward the right will pivot the lever 123 clockwise until the lever is positioned vertically and parallel to the wall 127, as indicated by the dot-dash line 157. During the latter half of the operating stroke, i.e., during the pivotal movement of the lever, the pin 149 will be moved from the right end of slot 147 to the left end of slot 147. In this neutral position, the pins 148, 149 will be in engagement with the left end of the members 144, 145, respectively.

To move the gear cluster 58 from its neutral position to its low speed position or to the left, as viewed in FIG. 4, solenoid 160 of the solenoid operated valve 151 is de-energized and solenoid 161 is energized to reverse the flow of fluid through the valve 151 and supply pressure fluid via conduit 165 to the right end of the cylinder 122. Supplying pressure to the right end of the cylinder 122 will cause the piston 136 and the piston rod 140 to move toward the left and exhaust fluid from the left end of the cylinder 122 to the atmosphere via conduit 166. For one-half of its travel to the left, no pivoting of the lever 123 will take place, since the right end of the slot 147 will not engage the pin 149 until one-half of the stroke of the piston 136 is completed. During the latter half of the stroke, the lever 123 will be pivoted clockwise, until the stroke of the piston 136 within the cylinder 122 is completed at which time the gear 67 will be meshed with the gear 66. When the gears 66, 67, intermesh, the lever 123 will be in the position indicated by the dash line 167. During this latter half of the stroke of the piston 136, the pin 148 will move within the slot 146 and at the end of the stroke the pin 148 will be engaged with the right end of the slot 146. To shift the gear cluster 58 back to the neutral position, the flow through the solenoid operated valve 151 is reversed by energizing solenoid 160 and de-energizing solenoid 161. The gear cluster 58 cannot be shifted from one of its speed or drive positions to the other without being first returned to its neutral position.

FIG. 5 illustrates an an alternate power actuated mechanism 169 which may be used for effecting linear movement of the gear cluster 58. The fluid actuated mechanism 169 comprises a fluid motor 170 which is operatively connected to the gear cluster 58 and selectively operable to shift the gear cluster 58 between the aforementioned low speed, neutral and intermediate speed poistions. The fluid motor 170 includes a hollow cylindrical member 171, an end closure or plug 172 threadably or otherwise secured within the right end of the cylinder 171 to form a first closed end wall or head and an end closure or cap member 173 threadably secured to an external threaded portion 174 at the left end of the cylinder 171 to form a second closed end wall or head. The cylinder 171 has a reduced diameter portion 177 extending for a portion of its length intermediate its ends. The left and right ends of the reduced diameter portion 177 form first and second abutment means 178 and 179, respectively.

Slidably received within the opposite ends of the cylinder 171 are first and second pistons 180 and 181. The pistons 180 and 181 have reduced diameter portions 182 and 183, respectively, which project axially toward each other and are slidably received within the reduced diameter portion 177 of the cylinder 171. The piston 180 is movable between the end wall 185 of the end cap member 173 and the first abutment means 178. The piston 181 is movable between the second abutment means 179 and the end closure 172. The distance between the end wall 185 and the first abutment means 178 and the axial length of the reduced diameter portion 182 of piston 180 is twice the distance between the second abutment means 179 and the end wall 172 and twice the axial length of the reduced diameter portion 183 of piston 181, respectively, for reasons which will hereinafter appear.

Formed integrally with the piston 180 is a piston rod 187 which extends through a central aperture formed within the end wall 185. The piston rod 187 contains an axial opening 188 which is open at its left end, as viewed in FIG. 5, and which extends for substantially the entire length of the rod 187. Received within the opening 188 is a stationary rod 190 which is suitably secured to a wall 191 of the spindle head C. Mounted on the left end of the piston rod 187 is a yoke member 192 which is operatively connected to the gear cluster 58 in a conventional manner. The rod 190 slidably supports the piston rod 187 and the yoke member 192.

The fluid motor 170 is operated by selectively supplying pressure fluid, such as air, to the opposite ends of the cylindrical chambers 192 and 193 formed between the end wall 185 and the first abutment means 178 and the second abutment means 179 and the end closure 172 in which the pistons 180 and 181 are slidably received, respectively. The flow of fluid to and from the chambers 192 and 193 of the fluid motor 170 is controlled by conventional solenoid operated valves 150 and 151, and in the same manner as the flow of fluid is controlled to the fluid motors 120 and 122 illustrated in FIG. 4 and heretofore described.

As illustrated in FIG. 5, when the solenoids 156 and 160 are energized and the solenoids 155 and 161 de-energized, fluid will be supplied via conduits 153 and 166 to the right and left ends of the chambers 193 and 192, respectively, which results in the piston 180 being positioned midway between the end wall 185 and the first abutment means 178. This position occurs because the area of the right side of the piston 181 is greater than the area of the left side of piston 180 and thus, the piston 181 will move to its leftmost position and abut the abutment means 179 and the axially projecting reduced diameter portion 183 thereof will abut the reduced diameter portion 182 of the piston 180 and limit the movement of the piston 180 toward the right. When the piston 180 is so positioned, the gear cluster 58 will be in its neutral position.

When it is desired to shift the gear cluster 58 to its low speed position, that is, toward the left, as viewed in FIG. 5, solenoid 160 is de-energized and solenoid 161 energized to reverse the flow through the valve 150 and supply pressure fluid to the right end of the chamber 192 via conduit 165 and move the piston 180 rapidly toward the left. As the piston 180 moves toward the left, the fluid contained in the left end of the chamber 192 will be exhausted to the atmosphere via conduit 166 and the piston rod 187 and the yoke member 192 will slide on the rod 190 and move the gear cluster 58 toward the left to engage gear 67 thereof with the gear 66 mounted on the spindle quill 18. In the low speed position, the piston 180 will abut the end wall 185. To return the gear cluster to its neutral position, the solenoid 161 is de-energized and solenoid 160 is energized to reverse the flow through the valve 151 and supply pressure fluid to the left end of the chamber 192 via conduit 166 and to exhaust the pressure fluid contained in the right end of the chamber 192 through conduit 165 to the atmosphere. Supplying pressure fluid to the left end of the chamber 192 will rapidly move the piston 180 to the right until the reduced diameter portion 182 will abut the reduced diameter portion 183 of the piston 181 at which time the gear cluster will again be in the neutral position.

To move the gear cluster 58 to the intermediate speed position, solenoid 156 is de-energized and solenoid 155 is energized to reverse the flow through the valve 151 and supply pressure fluid via conduit 152 to the left end of the chamber 193 to move the piston 181 toward the right. Movement of piston 181 toward the right will exhaust the fluid contained within the right end of the chamber 193 through conduit 153 to the atmosphere. As piston 181 moves toward the right, piston 180 will also move toward the right, since the left end of the chamber 192 remains pressurized. In the intermediate speed position, the piston 181 will abut the wall 172 and the piston 180 will abut the abutment means 178. To return the gear cluster 58 to its neutral position, the solenoid 155 is de-energized and the solenoid 156 is energized to reverse the flow of fluid through the valve 150 and supply pressure fluid to the right end of the chamber 193 via conduit 153. Movement of the piston 181 toward the left will exhaust the fluid contained within the left end of the chamber 193 through conduit 152 to the atmosphere. Since the reduced diameter portion 183 of the piston 181 abuts the reduced diameter portion 182 of the piston 180 and since the area on the right side of the piston 181 is greater than the area on the left side of the piston 180, the piston 180 will be moved toward the left by the piston 181 until the piston 181 abuts the abutment means 179, at which time the gear cluster 58 will again be in the neutral position.

The various movements of the pistons 180, 181 are effected in a rapid manner and in order to prevent undue impact between the pistons and their respective abutments, means to cushion the force of the impacts are provided. Interposed between the rod 190 and the closed or right end of opening 188, as viewed in FIG. 5, is a compression spring 230. When the piston 180 is rapidly moved to the left, the spring 230 will be compressed and exert a small force in the opposite direction to the direction of movement of the piston 180. The force exerted by the spring 230 will increase as the piston approaches the wall 185 and cushion the impact between the piston 180 and the wall 185. Both reduced diameter portions 182 and 183 of the pistons 180 and 181, respectively, contain axial openings 231 and 232, respectively, in which a compression spring 235 is interposed. The spring 235 functions in the same manner as spring 230 to cushion the impact between the abutment 178 and the piston 180, the abutment 179 and the piston 181 and the abutting ends of the reduced diameter portions 182 and 183. The end closure 172 has a restricted opening 236 which communicates with the conduit 153. The size of this opening is such that a back pressure is exerted on the piston 181 when it is rapidly moved toward the right. This back pressure will serve to cushion the impact between the piston 181 and the end closure 172.

The interior of the openings 231, 232 and 188 are vented to the atmosphere via passageway 240 extending between the right end of opening 188 and the left end of opening 231, as viewed in FIG. 5, and passageway 241 extending the length of the rod 190, the left end of which is open to the atmosphere.

The control system employed in the machine shown for effecting speed changes for the change speed transmission K will be described with reference to the schematic electrical diagrams illustrated in FIGS. 6 and 7. To initially begin operation of the machine, the power lines or conductors $L_1$, $L_2$ are connected with their power source to supply power thereto. If the shift gear cluster 58 was not already in the neutral position, it will immediately move toward this position because, upon the connection of the conductors $L_1$, $L_2$ with the power source, circuits are completed from power conductor $L_1$ through normally closed contacts 280–1 of relay 280, wire 282, solenoid 155 for valve 150 to $L_2$ and from the conductor $L_1$ through normally closed contacts 290–1 of relay 290, wire 292, solenoid 160 for valve 151 to $L_2$. Completion of these circuits will energize solenoids 155 and 160. Energization of solenoids 155 and 160 will move the gear cluster 58 toward its neutral position if the cluster is not already in its neutral position.

Upon the energization of the conductors $L_1$, $L_2$ a circuit is also completed from power conductor $L_1$ through normally closed, delayed open instant closing switch 300–1 of time delay relay 300, wire 301 normally closed, instant open delayed closing switch 302–1 of time delay relay 302, wire 303 and relay 305 to $L_2$. Energization of relay 305 closes normally open contacts 305–1. The closing of contacts 305–1 completes a circuit from power conductor $L_1$ through normally closed, delayed open instant closing switch 300–1 of time delay relay 300, wire 301, now closed contacts 305–1, wire 308 and relay 310 to $L_2$.

Energization of relay 310 closes normally open contacts 310–1 and 310–2. Contacts 310–1 are located in a parallel circuit between wires 306 and 308 which bypasses contacts 305–1 and completes a bypass or holding circuit for relay 310 around the contacts 305–1. A suitable indicator light 312 located in a parallel circuit between wire 308 and conductor $L_2$ and around relay 310 is provided for the purpose of indicating to the operator that relay 310 has been energized. The closing of contacts 310–2 performs no present function.

Furthermore, upon the energization of the parallel conductors $L_1$ and $L_2$ a circuit is completed from power conductor $L_1$ through normally closed contacts 320–1 of relay 320, wire 321 and time delay relay 325 to $L_2$ and a circuit is completed from parallel power conductor $L_1$ through normally closed contacts 320–1 of relay 320, wire 321, and relay 330 to $L_2$. Completion of these circuits energizes relays 325 and 330. Energization of relays 325 and 330 opens normally closed, delayed open instant closing switch 325–1 after a predetermined time delay and closes normally open contacts 325–2, and closes normally open contacts 330–1 and 330–2, respectively. The functions performed by the delayed opening of switch 325–1 and the closing of contacts 325–2, 330–1 and 330–2 will be described hereinafter.

Figure 6:
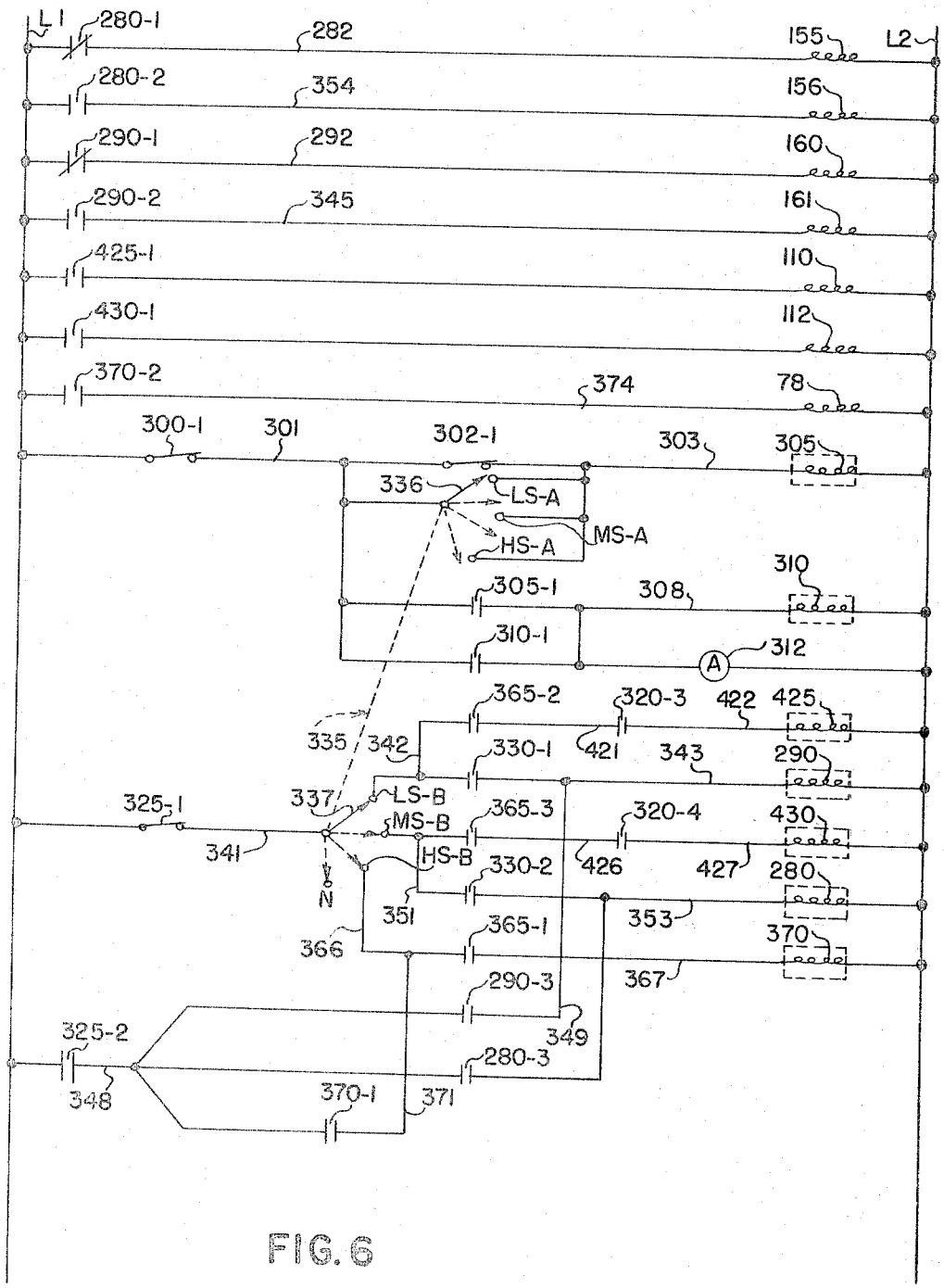
FIGS. 6 and 7 are wiring diagrams of that part of the electrical control system of the machine illustrated in FIG. 1 which is involved in effecting a speed change in the spindle drive transmission.

The control system includes a conventional manually operable spindle speed selector switch, indicated generally by reference character 335 and shown schematically in FIG. 6. The switch 335 comprises a stator element having first and second spaced apart sets of contacts, the first set of which has three arcuately spaced contacts, i.e., contacts LS–A, MS–A and HS–A and the second set of which has four arcuately spaced contacts, i.e., contacts LS–B, MS–B, HS–B and N, and a rotor element having a pair of spaced apart contact arms 336 and 337 selectively engageable with the respective contacts of the first and second set. The first set of contacts are located in normally open parallel circuits between wires 301 and 303 which bypass the switch 302–1. The respective contacts of the second set are located in circuits containing the relays for the respective planetary clutches 110 and 112 and the clutch 78 and the relays for operating the solenoids 155 and 156 and 160 and 161. The rotor is selectively movable between four different positions, i.e., a low speed position in which the contact arm 337 engages contact LS–B, a medium speed position in which the contact arm 337 engages the contact MS–B, a high speed position in which the contact arm 337 engages the contacts HS–B and a neutral position in which the contact arm 337 is in position N. The contact arms 336 and 337 are angularly offset from one another such that when the contact arm 337 is selectively engaged with one of the contacts of the second set, the contact arm 336 will not be engaged with its respective contact of the first set. The contact arm 336 only engages its respective contacts for an instant when the rotor is moved from one position to another, and for reasons which will become apparent hereinafter.

The rotor of the switch 335 is always located in one of the four above-mentioned positions, and hence, the contact arm 337 will presently be in contact with one of the contacts of the second set or in the neutral position. Assuming, as shown in the schematic diagram, that the contact arm 337 is in contact with the low speed position contacts LS–B, upon the connection of the power conductors $L_1$ and $L_2$ to the power lines, a circuit is completed from power conductor $L_1$ through delayed open instant close switch 325–1 of relay 325, which switch presently remains in its closed position, since it has a delayed opening, wire 341, contact arm 337, the LS–B contacts, wire 342, now closed contacts 330–1 of relay 330, wire 343 and relay 290 to $L_2$ and energizes relay 290. Energization of relay 290 will open normally closed contacts 290–1, close normally open contacts 290–2 and 290–3 and open normally closed contacts 290–4. The opening of contacts 290–1 breaks the circuit between power conductors $L_1$ and $L_2$, in which the solenoid 160 for valve 151 is located. The closing of contacts 290–2 completes a circuit from power conductor $L_1$ through now closed contacts 290–2, wire 345 and solenoid 160 for valve 151 to $L_2$. The energization of solenoid 161 and the de-energization of solenoid 160 will move the gear cluster 58 toward its low speed position. The closing of contacts 290–3 completes a circuit from power conductor $L_1$ through now closed contacts 325–2 of relay 325, wire 348, now closed contacts 290–3, wire 343 and relay 290 to $L_2$. This latter circuit is a holding circuit which keeps the relay 290 energized when the switch 325–1 opens after a predetermined time has elapsed. The opening of contacts 290–4 performs no present function.

Had the contact arm 337 of the selector switch 335 been located in the intermediate speed position MS–B, when power was applied to power conductors $L_1$ and $L_2$, a circuit would have been completed between power conductor $L_1$ through delayed open instant close contacts 325–1, which switch would have been closed since they are delayed opening, wire 341, contact arm 337, contacts MS–B, wire 351, now closed contacts 330–2 of relay 330, wire 353 and relay 280 to $L_2$ and relay 280 would have been energized. Energization of relay 280 would have opened normally closed contacts 280–1, closed normally open contacts 280–2 and 280–3 and opened normally closed contacts 280–4. The opening of contacts 280–1 would have broken the circuit containing the solenoid 155 for valve 150 and the solenoid 155 would have been de-energized. The closing of contacts 280–2 would have completed a circuit from power conductor $L_1$ through now closed contacts 280–2, wire 354, solenoid 156 for valve 150 to $L_2$ energizing solenoid 156. De-energization of solenoid 155 and energization of solenoid 156 would have moved the gear cluster 58 toward its intermediate speed position. The closing of contacts 280–3 would have completed a circuit from power conductor $L_1$ through now closed contacts 325–2 of relay 325, wire 348, now closed contacts 280–3, wire 353, relay 280 to $L_2$. This circuit would have provided a holding circuit for relay 280 and kept the relay 280 energized when the switch 325–1 later opened after a predetermined time had elapsed and broken the circuit in which it and the relay 280 are located. The opening of contacts 280–4 would not have performed any present function.

Had the selector switch 335 been located in the high speed position, the solenoid 155 for valve 150 and solenoid 160 for valve 151, when initially energized by connecting the power conductors $L_1$, $L_2$ to their source, would have moved the gear cluster 58 to its neutral position. With the shift gear cluster 58 in the neutral position, a normally open neutral position limit switch 360 suitably supported within the spindle head C would have been closed by a bolt or stem 361 threadably secured to and projecting perpendicularly from the lever 123, as illustrated in FIG. 4. If the alternate arrangement of FIG. 5 is employed, the neutral position limit switch (not shown) would have been actuated by the stem 361 threadably secured to and projecting transversely from the yoke member 192. The closing of the neutral position limit switch 360 would have completed a circuit from power conductor $L_1$ through now closed neutral position limit switch 360, wire 364 and relay 365 to $L_2$. Energization of relay 365 would have closed its normally open contacts 365–1, 365–2, 365–3 and 365–4. The closing of contacts 365–1 would have completed a circuit from power conductor $L_1$ through delayed open instant close switch 325–1, which switch would still be in its closed position, since it has a delayed opening, wire 341, contact arm 337, contacts HS–B, wire 366, now closed contacts 365–1 of relay 365, wire 367 and relay 370, to $L_2$ and energized relay 370. The closing of contacts 365–2, 365–3 and 365–4 would not have performed any present function. Energization of relay 370 would have closed contacts 370–1 and 370–2. The closing of contacts 370–1 would have completed a circuit from power conductor $L_1$ through now closed contacts 325–2 of relay 325, wire 348, now closed contacts 370–1, wire 366, now closed contacts 365–1, wire 367 and relay 370 to $L_2$. This circuit would have provided a holding circuit for the relay 370 and kept the relay 370 energized when the switch 325–1 later opened after a predetermined time had elapsed. The closing of contacts 370–2 would have completed the circuit from power conductor $L_1$ through now closed contacts 370–2, wire 374 and clutch 78 to $L_2$ and energized the clutch 78. Energization of the clutch 78 would have effected a high speed drive connection for the spindle quill 18.

Had the selector switch 335 been located in the neutral position, i.e., with the contact arm 337 in neutral position N, no circuit would have been completed through the switch 335 and the gear cluster 58 would have merely moved into and remained in the neutral position upon energization of power conductors $L_1$ and $L_2$.

As the gear cluster 58 moves toward its low speed position, it may or may not mesh with the low speed gear 66 carried by the spindle quill 18 depending upon whether or not the angular position of the respective gear teeth of the respective gears in such that they will mesh with each other. However, it makes no difference at the present time whether or not the gear shift cluster 58 is in mesh with the low speed gear 66 because it is not possible at present to energize the motor 20 and effect a drive for the spindle because the circuits containing the motor and its operating relays are presently open. Likewise, if the gear cluster had been moved into the medium speed position or if a high speed drive connection had been effected, it would not be possible at present to energize the motor 20. The operating relays for the motor 20 can only be energized by initiating and executing a proper shift cycle, as will become more fully apparent hereinafter.

Additionally, upon connecting the power conductors $L_1$ and $L_2$ with their power source, a circuit is completed from power conductor $L_1$ through normally closed contacts 380–1 of forward motor relay 380, wire 381, normally closed contacts 382–1 of reverse motor relay 382, wire 383, and motor plugging relay 385 to $L_2$. Energization of relay 385 will close normally open contacts 385–1. The closing of contacts 385–1 performs no present function.

When the operator desires to drive the spindle at low speed he will move the selector switch 335 to the low speed position, if it is not already in the low speed position, and depress push button switch 400 for a moment, which switch will initiate operation of the shift cycle to shift the gear cluster 58 to its low speed position. Depression of the switch 400 will complete a circuit from power conductor $L_1$ through normally closed contacts 410–1 of relay 410, wire 411, switch 400, wire 412, normally open but now closed contacts 310–2 of relay 310, wire 413 and relay 320 to $L_2$. Completion of this circuit energizes relay 320 which in turn open contacts 320–1, closes contacts 320–2, 320–3, 320–4, 320–5, 320–6 and opens contacts 320–7.

Contacts 320–2 are in a parallel circuit between the wires 410 and 413 with push button switch 400, wire 412 and contacts 310–2 and the closing thereof completes a bypass or holding circuit for relay 320 around switch 400 and contacts 310–2 and keeps the relay 320 energized after the push button switch 400 is released and after contacts 310–2 are later opened.

The openings of contacts 320–1 break the circuits between power conductors $L_1$ and $L_2$ in which relays 325 and 330 are located. The de-energization of relays 325 and 330 closes delayed open instant close switch 325–1 and opens contacts 325–2 and contacts 330–1 and 330–2, respectively. The opening of contacts 325–2 breaks the holding circuit between power conductors $L_1$ and $L_2$ in which the contacts 325–2 and relay 290 are located and de-energizes relay 290. Even though the switch 325–1 is now closed, the circuit between power conductors $L_1$ and $L_2$ in which the switch 325–1 contacts 330–1 and relay 290 are located is broken since contacts 330–1 are now open. The opening of contacts 330–2 performs no present function. The de-energization of relay 290 closes contacts 290–1, opens contacts 290–2 and 290–3 and closes contacts 290–4. The closing of contacts 290–1 completes the circuit between power conductors $L_1$ and $L_2$ in which they and the solenoid 160 for valve 151 are located. The opening of contacts 290–2 breaks the circuit between power conductors $L_1$ and $L_2$ in which they and the solenoid 161 for valve 151 are located. The energization of solenoid 160 and de-energization of solenoid 161 will shift the gear cluster 58 toward the neutral position. The opening of contacts 290–3 and the closing of contacts 290–4 perform no present function.

When the gear cluster 58 is moved into its neutral position, the neutral position limit switch 360 will be actuated to its closed position and complete the circuit between power conductors $L_1$ and $L_2$ in which it and relay 365 are located. Energization of relay 365 closes its normally open contacts 365–1, 365–2, 365–3 and 365–4. The closing of contacts 365–1 performs no present function.

Since contacts 320–3 of relay 320 are now closed, the closing of contacts 365–2 of relay 365 completes a circuit from power conductor $L_1$ through normally closed, delayed open instant close switch 325–1 of time delay relay 325, which relay is now de-energized, wire 341, contact arm 337, contacts LS–B, wire 342, now closed contacts 365–2, wire 421, now closed contacts 320–3, wire 422 and relay 425 to $L_2$. Energization of relay 425 closes normally open contacts 425–1 and energizes the low speed planetary brakes 110 which are connected in a series circuit between conductors $L_1$ and $L_2$ with the contacts 425–1 of relay 425. As stated hereinbefore, energization of planetary brakes 110 will prevent the orbit gear cluster 100 from rotating and connect a low speed drive for the spindle.

Had intermediate or medium speed been desired and preselected, the planetary brakes 112 would have been energized because a circuit would have been completed from power conductor $L_1$, through normally closed delayed open instant close switch 325–1 of relay 325, wire 341, contact arm 337, contacts MS–B, wire 351, now closed contacts 365–3, wire 426, now closed contacts 320–4, wire 427 and relay 430 to $L_2$. Energization of relay 430 would have closed its normally open contacts 430–1 to energize the planetary brakes 112 which are in series circuit therewith and the intermediate speed drive connection for the spindle quill 18 would have been effected.

Had high speed been preselected, the circuits containing relay 370 would have been completed and relay 370 energized subsequent to depressing the push button switch 499. Energization of relay 370 would have energized the clutch 78 and effected a high speed drive connection between the shaft 54 and the spindle quill.

As previously mentioned, the energization of relays 320 and 365 closed contacts 320–5 and 365–4, respectively. Closing of contacts 320–5 and 365–4 completes a circuit from power conductor $L_1$ through normally closed contacts 410–2 of relay 410, wire 440, now closed contacts 320–5, wire 441, now closed contacts 365–4, wire 442 and time delay relay 300, to $L_2$. Energization of the time delay relay 300 opens, delayed open instant close switch 300–1 after a predetermined time has elapsed, and closes, instant open delayed closing switch 300–2 after a predetermined time has elapsed and closes contacts 300–3. The contacts 300–3 are in a parallel circuit between wires 441 and 442 with contacts 365–4 and the closing of contacts 300–3 completes a bypass or holding circuit for relay 300 around contacts 365–4. After a predetermined time has elapsed, switch 300–1 will open and switch 300–2 will close. Opening of switch 300–1 breaks the hereinbefore described circuits in which it and the relays 305 and 310 are located. The de-energization of relays 305 and 310 opens contacts 305–1 and open contacts 310–1 and 310–2, respectively, all of which perform no present function.

The closing of switch 300–2 completes a circuit from power conductor $L_1$ through normally closed contacts 410–2 of relay 410, wire 440, now closed contacts 320–5, wire 441, now closed contacts 365–4 or now closed contacts 300–3, wire 442, now closed, instant open delayed closing switch 300–2, wire 444 and motor relay 380 to $L_2$. Energization of motor relay 380 opens normally closed contacts 380–1 and closes normally open contacts 380–2 and 380–3. The opening of contacts 380–1 breaks the circuit between conductors $L_1$ and $L_2$ containing relay 385. De-energization of relay 385 opens contacts 385–1. The opening of contacts 385–1 performs no present function. The closing of contacts 380–2 completes a circuit between power conductor $L_1$, now closed contacts 380–2, wire 451 and motor 20 to $L_2$ and energizes the motor 20. Energization of the motor 20 rotates the gear cluster 58 and the spindle quill 18. Contacts 380–3 are located in a parallel circuit between power conductor $L_1$ and wire 440 around contacts 410–2 and the closing of contacts 380–3 completes a bypass circuit around contacts 410–2. The reason for providing this bypass circuit will become apparent hereinafter.

Connected to the motor in the conventional manner is an electrical tachometer-generator 460 and a voltage sensitive relay 461. The tachometer-generator 460 generates a voltage proportional to the speed of the motor 20, and when the speed of the motor reaches a predetermined value, for example, 40% of its rated speed, the voltage sensitive relay 461 will be energized and close contacts 461–1. Closing of contacts 461–1 completes a circuit from power conductor $L_1$ through now closed contacts 461–1, wire 462 and relay 410 to $L_2$. Energization of relay 410 opens normally closed contacts 410–1 and 410–2. Opening of contacts 410–1 breaks the aforementioned circuit between power conductors $L_1$ and $L_2$ in which relay 320 is located and de-energizes relay 320. De-energization of relay 320 will close contacts 320–1, open contacts 320–2, 320–3, 320–4, 320–5, 320–6 and closes contacts 320–7. Opening of contacts 320–2 breaks the aforementioned bypass circuit around switch 400 and contacts 310–2 and prevents relay 320 from being re-energized when contacts 410–1 are again closed shortly after their opening, as will hereinafter appear. Opening of contacts 320–3 breaks the aforementioned circuit between power conductors $L_1$ and $L_2$ in which relay 425 is contained. De-energization of relay 425 opens contacts 425–1 and breaks the circuit containing the low speed planetary brakes 110. De-energization of the low speed planetary brakes 110 allows the orbit gear cluster 100 to freely rotate and disconnects the driving connection to the spindle quill 18 and allows the quill 18 to freely decelerate.

Closing of contacts 320–1 completes the circuits from power conductors $L_1$ to $L_2$ containing the relays 325 and 330. Energization of relay 325 will open, delayed open instant close switch 325–1 after a predetermined time delay and close contacts 325–2. Energization of relay 330 will close contacts 330–1 and 330–2. Closing of contacts 330–1 completes the circuit containing these contacts and relay 290. Energization of relay 290 will open contacts 290–1, close contacts 290–2 and 290–3 and open contacts 290–4. The closing and opening of contacts 290–1 and 290–2, respectively, will function to initiate movement of the gear cluster 58 toward the low speed position. Closing of contacts 290–3 will complete the holding circuit for relay 290 containing now closed contacts 290–3 and relay 290. The opening of contacts 290–4 performs a function to be described hereinafter.

As the gear cluster 58 is shifted from the neutral position toward the low speed position, the neutral limit switch 360 will be opened. The opening of this switch breaks the circuit between conductors $L_1$ and $L_2$ in which relay 365 is located and de-energizes relay 365. De-energization of relay 365 will open contacts 365–1, 365–2, 365–3, and 365–4. Opening contacts 365–1, 365–2, 365–3 and 365–4 will not serve any present because the circuits in which they are located have already been broken by the previous de-energization of relay 320.

At the same time that movement of the gear cluster 58 is initiated toward its low speed position and the planetary brakes 110 de-energized, the opening of contacts 410–2 and contacts 320–5 break the aforementioned circuits containing these contacts and the relay 300 and the motor relay 380. De-energization of the time delay relay 300 closes, delayed open instant close switch 300–1, opens, instant open delayed close switch 300–2 and opens contacts 300–3, all of which perform no present function. The de-energization of relay 380 closes contacts 380–1 and opens contacts 380–2 and 380–3. Opening of contacts 380–2 breaks the circuit between the power conductors $L_1$ and $L_2$ in which motor 20 is contained and de-energizes the motor 20. The motor 20 will begin to decelerated and coast toward a stop at this time. The closing of contacts 380–1 completes the circuit containing these contacts and relay 385. Energization of relay 385 closes contacts 385–1. The closing of contacts 385–1 performs a function to be described hereinafter. The opening of contacts 380–3 performs no present function.

As the motor 20 decelerates and the speed thereof falls below the preedtermined value, the voltage sensitive relay 461 will be de-energized and open contacts 461–1. Opening of contacts 461–1 will break the circuit containing relay 410 and de-energize relay 410. De-energization of relay 410 will close contacts 410–1 and 410–2. The closing of contacts 410–1 and 410–2 performs no present function.

It is thus apparent from the foregoing that the shift of the gear cluster 58 from its neutral position toward its low speed position occurs while the spindle quill 18 and the gear 67 fixed thereto and the gear cluster 58 are decelerating. The control system further contains provisions for indicating whether or not the shift to the low speed position has been completed and for preventing operation of the machine in the event that the shift is not properly completed, as will be presently described.

Beforehand, when relay 320 was energized, normally open contacts 320–6 thereof were closed. The closing of contacts 320–6 completed a circuit from power conductor $L_1$ through the then closed contacts 320–6, wire 470, normally closed contacts 290–4, which were then closed since relay 290 was not yet energized, wire 474, normally closed contacts 280–4 of relay 280, wire 475 and time delay relay 302 to $L_2$. The energization of time delay relay 302 opened, instant open delayed close switch 302–1 closed, instant close delayed open switch 302–2 and closed contacts 302–3 and 302–4. Opening of switch 302–1 broke the circuit between the conductors $L_1$ and $L_2$ containing this switch and relay 305. De-energization of relay 305 opened contacts 305–1. The opening of contacts 305–1 performed no present function. The closing of delay open, instant close switch 302–2 also completed a circuit between power conductors $L_1$ and $L_2$ through the then closed switch 302–2, wire 470, the then and normally closed contacts 290–4 of relay 290, wire 474, normally closed contacts 280–4 of relay 280 wire 475 and relay 302 to $L_2$. The closing of contacts 302–3 and 302–4 performed no present function. When the relay 320 was later de-energized and contacts 320–6 opened, the aforementioned circuit containing these contacts was broken, but the relay 302 temporarily remained energized due to the last named circuit, i.e., the circuit containing the delayed open, instant close switch 302–2 of time delay relay 302. However, when relay 290 was later energized, normally closed contacts 290–4 thereof were opened and thus, the last named circuit between power conductors $L_1$ and $L_2$ containing relay 302 was broken. De-energization of relay 302 will close, instant open delayed close switch 302–1 and open, instant close delayed open switch 302–2 after a predetermined time has elapsed and opened contacts 302–3 and 302–4. The opening of contacts 302–3 and 302–4 performed no present function. The function performed by the delayed closing and opening of switches 302–1 and 302–2 will be presently described.

If the shift to the low speed position is completed, i.e., if gear 67 engages gear 66, the shift gear cluster 58 will engage and trip a low speed position limit switch 480. The switch 480 is suitably supported within the spindle head C adjacent the shaft 60 and is engaged by the gear cluster 58 when it is in the low speed position. Closing of the switch 480 completes a circuit between power conductor $L_1$ through still closed, instant close delay open switch 302–2 of relay 302, wire 470, now closed switch 480, wire 474, normally closed contacts 280–4 of relay 280, wire 475, relay 302 to $L_2$. Energization of relay 302 will keep delayed close, instant open switch 302–1 open and delayed open, instant close switch 302–2 closed and close contacts 302–3 and 302–4.

If intermediate speed had been preselected, and the shift to the intermediate speed position completed, a medium speed position limit switch 490 would have been closed. The switch 490 is suitably supported within the spindle head C and is engaged by the gear cluster 58 when it is in the intermediate speed position. The closing of limit switch 490 would have completed a circuit from power conductor $L_1$ through still closed switch 302–2, wire 470, normally closed contacts 290–4 of relay 290, wire 474, switch 490, wire 475 and time delay relay 302 to $L_2$.

If high speed had been preselected, the relay 302 would remain energized upon initially being energized by the closing of contacts 320–6 and the completion of the circuit containing these contacts and relay 302, since contacts 290–4 and 280–4 of relays 290 and 280 will remain in their closed position.

The closing of contacts 302–3 completes a circuit between power conductor $L_1$ through now closed contacts 385–1 of relay 385, wire 492, now closed contacts 302–3, wire 493 and motor 20 to $L_2$. This circuit is a plugging circuit for the motor 20 and rapidly brings the motor, which is coasting, to a stop position.

Once the shift is completed and contacts 302–4 are closed, the operator can selectively drive and rotate the spindle in a forward or reverse direction. If forward rotation is desired, he will move the manually operable selector switch 500 to the forward position F and a circuit will be completed from power conductor $L_1$ through normally closed contacts 410–2 which are now closed since relay 410 is now de-energized, wire 440, normally closed contacts 320–7, which contacts are now closed since relay 320 is de-energized, wire 502, now closed contacts 302–4, wire 503, selector switch 500, wire 444 and relay 380 to $L_2$. Energization of relay 380 opens contacts 380–1 and closes contacts 380–2 and 380–3. The opening of contacts 380–1 breaks the circuit between conductors $L_1$ and $L_2$ containing the relay 385. De-energization of relay 385 opens contacts 385–1 to break the plugging circuit to the motor 20. The closing of contacts 380–2 completes the circuit containing motor 20 and energizes the motor 20 to drive the spindle 17.

The closing of contacts 380–3 completes the bypass circuit around contacts 410–2 to keep the relay 380 energized when contacts 410–2 are later opened as the result of the voltage relay 461 and the relay 410 being subsequently energized when the motor speed reaches a predetermined value, as hereinbefore described.

If reverse rotation of the spindle had been desired, selector switch 500 would have been moved to its reverse position R and a circuit completed from power conductor $L_1$, through normally closed contacts 410–2, wire 440, normally closed contacts 320–7, wire 502, now closed contacts 302–4, wire 503, switch 500, wire 507 and reverse motor relay 382. Energization of motor relay 382 would open contacts 382–1 and close contacts 382–2 and 382–3. The opening of contacts 382–1 would break the circuit containing relay 385. De-energization of relay 385 would open contacts 385–1 and break the plugging circuit to the motor 20. Closing of contacts 382–2 would complete a circuit from power conductor $L_1$, now closed contacts 382–2, wire 512 and motor 20 to $L_2$. The completion of this circuit would energize motor 20 and rotate the motor 20 in a reverse direction. The contacts 382–3 are located in a parallel circuit between power conductor $L_1$ and wire 440 around contacts 410–2 and when closed complete a bypass circuit around contacts 410–2 to keep relay 380 energized when contacts 410–2 are later opened by the energization of relay 410.

If the gears 67 and 66 did not intermesh and a proper shift was not completed, the low speed position switch 480 would not be engaged and the relay 302 would not be re-energized. Therefore, the instant open delayed close switch 302–1 will close and the instant close, delayed open switch 302–2 will open after a predetermined time. When the switch 302–1 closes, a circuit is again completed between power conductors $L_1$ and $L_2$ containing relay 305. Energization of relay 305 closes contacts 305–1. Closing of contacts 305–1 will complete the circuit between conductors $L_1$ and $L_2$ containing relay 310 and energize relay 310. Energization of relay 310 will close contacts 310–1 and contacts 310–2. When relay 310 is energized, the indicator light will go on and indicate to the operator that the shift has not been completed. The operator will then depress push button switch 400 again for an instant and re-initiate the shifting cycle. When the push button switch 400 is depressed, the same subsequent sequence of operations will take place as hereinbefore described.

Figure 7:
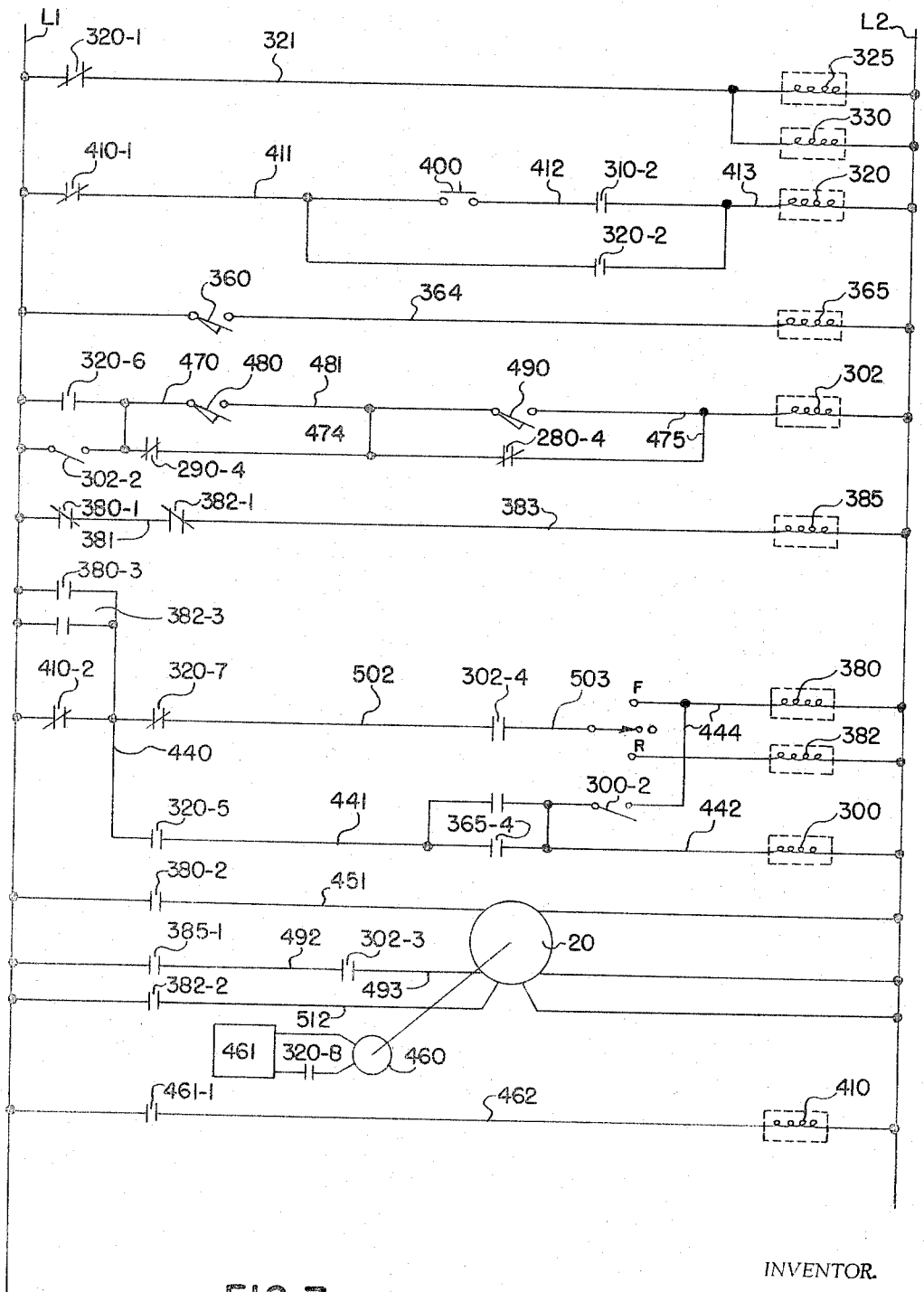

To effect a change from low speed operation to intermediate speed operation, the operator will move the switch 500 to its off position O, as illustrated in FIG. 7, and move the selector switch 335 to the intermediate or medium speed position MS–B. When switch 500 is turned to its off position, the aforementioned circuit between power conductors $L_1$ and $L_2$ in which switch 500 and relay 380 are contained will be broken. De-energization of relay 380 will close contacts 380–1 and open contacts 380–2 and 380–3. The opening of contacts 380–2 breaks the circuit between conductors $L_1$ and $L_2$ in which motor 20 is located and de-energizes the motor. The closing of contacts 380–1 completes the circuit between power conductors $L_1$ and $L_2$ in which relay 385 is located. Energization of relay 385 will close contacts 385–1. The closing of contacts 385–1 completes the aforementioned plugging circuit for the motor 20 and rapidly brings the motor 20 to a stop. The opening of contacts 380–3 does not perform any present function.

As the operator moves the selector switch 335 to the medium speed position from the low speed position, the contact arm 336 will momentarily contact the contact LS–A and a circuit will be completed from power conductor L₁ through normally closed, instant close delayed open switch 300–1, wire 301, contact arm 336, contact LS–A, wire 303 and relay 305 to L₂. Energization of relay 305 closes contacts 305–1. The closing of contacts 305–1 completes the circuit between conductors L₁ and L₂ in which these contacts and relay 310 are located. Energization of relay 310 closes contacts 310–1 and 310–2. The functions performed by these contacts have been described hereinbefore.

As previously mentioned, the contact between the contact arm 336 and the contact LS–A is only for a moment while the selector switch 335 is moved from its low speed position to its medium speed position and thus, the circuit between conductors L₁ and L₂ containing this contact and relay 305 will be broken when the switch is in the medium speed position. De-energization of relay 305 will open contacts 305–1. Relay 310 will remain energized, however, by virtue of the bypass circuit around contacts 305–1 containing contacts 310–1, which are now closed.

To initiate shifting of the gear cluster 58 to the intermediate speed position, the operator depresses the push button switch 400 for a moment and completes the circuit between power conductors L₁ and L₂ containing the switch 400 and relay 320. When relay 320 is energized, the same subsequent sequence of operations will take place as hereinbefore described except that the circuits containing relay 280 will be subsequently completed and the relay 280 energized to effectuate a shift of the gear cluster 58 into the medium speed position as heretofore described.

To effect a change from low speed operation to high speed operation, the operator will move the switch 500 to its off position O, as illustrated in FIG. 7, and move the selector switch 335 to the high speed position HS–B. The same sequence of operations will take place as described above in effecting a shift from low speed operation to medium speed operation except that the circuits containing relay 370 will be subsequently completed and the relay 370 energized to effectuate a high speed drive connection, as heretofore described.

While in the preferred embodiment of the control system of the invention, the speed changes are effected by shifting the gear cluster 58 when the motor is de-energized and the gear cluster 58 and spindle 17 decelerating, it will be apparent to those skilled in the art that the control system could be designed or modified so that the speed changes could be effected while the motor is energized and the gear cluster 58 and spindle 17 are being driven. If the latter method were employed, the planetary brakes 110, 112 when energized to effect a drive for the spindle quill 18 would remain energized during the shift and until the shift is completed and an appropriate position limit switch actuated.

From the foregoing, it will be apparent that the objects of the invention heretofore enumerated and others have been accomplished and that I have provided a novel apparatus comprising a speed change transmission of the shifting gear type wherein speed changes can be effected rapidly and smoothly.

While the preferred form of the invention has been described in considerable detail, it will be apparent that the invention is not limited to the construction shown and it is my intention to cover hereby all adaptations, modifications and changes therein which come within the practices of those skilled in the art to which the invention relates and the scope of the appended claims.

Having thus described my invention, I claim:

1. In a machine tool, a first gear, a first shaft, means for driving said first gear and said first shaft in timed relation, a tool spindle, a second gear operatively connected to said tool spindle, drive means selectively operable for operatively connecting said first shaft and tool spindle to drive said second gear at a speed which is at or near synchronous speed with that of said first gear, said drive means including a planetary gear transmission having a sun gear fixed to said first shaft, planet gears in the plane of and encircling said sun gear and carried by a member supported for free rotation coaxial with said first shaft, means operatively connecting said member to said second gear, a freely rotatable orbit gear encircling said planet gears and in the plane thereof, selectively engageable brake means for restricting rotation of said orbit gear, and control means for engaging and disengaging said brake means and engaging said first and second gears while at or substantially at synchronous speed.

2. In a change speed transmission, a first gear and a first shaft driven in timed relation with said first gear from a power source, a second shaft adapted to be driven, a second gear operatively connected to said second shaft, a third gear continuously in mesh with one of said first and second gears and adapted to be selectively meshed with the other of said first and second gears, drive means selectively operable for operatively connecting said first and second shafts to drive said second gear at a speed which is at a near synchronous speed with the speed of said first gear, and control means for automatically engaging said third gear with the other of said first and second gears.

3. In a change speed transmission, a first gear and a first shaft driven in timed relation with said first gear from a power source, a second shaft adapted to be driven, a second gear operatively connected to said second shaft, a third gear continuously in mesh with one of said first and second gears and adapted to be selectively meshed with the other of said first and second gears, drive means selectively operable for operatively connecting said first and second shafts to drive said second gear at a speed which is at a near synchronous speed with the speed of said first gear, said drive means including a planetary gear transmission having a sun gear fixed to said first shaft, planet gears operatively connected to a member coaxial with said first shaft and operatively connected to said second gear, and a freely rotatable orbit gear, selectively engageable brake means for restricting rotation of said orbit gear, and control means for automatically disengaging said brake means and engaging said third gear with the other of said first and second gears.

4. In a change speed transmission, a first gear and a first shaft driven in timed relation with said first gear from a power source, a second shaft adapted to be driven, a second gear operatively connected to said second shaft, a third gear continuously in mesh with said first gear and adapted to be selectively meshed with said second gear, drive means selectively operable for operatively connecting said first and second shafts to drive said second gear at a speed which is at a near synchronous speed with the speed of said third gear, said drive means including a planetary gear transmission having a sun gear fixed to said first shaft, planet gears operatively connected to a member coaxial with said first shaft and operatively connected to said second gear and a freely rotatable orbit gear, selectively operable brake means for restricting rotation of said orbit gear of said planetary gear transmission, and control means for automatically disengaging said brake means and engaging said third gear with said second gear.

5. In a change speed transmission for a machine tool having a rotatable spindle, a first shaft having a first gear slidably carried thereon and movable in a direction parallel to said spindle, a second shaft, a second gear carried by said spindle, said first gear adapted to be moved along said first shaft to selectively engage said gear carried by said spindle, an electric motor for rotating said first gear and said second shaft, means for energizing said electric motor, drive means selectively operable to drivingly interconnect said second shaft and said spindle to drive said second gear carried by said spindle at a speed substantially the same as the speed of said first gear, and control means for automatically disconnecting said driving connection between said second shaft and said spindle, and de-energizing said electric motor and moving said first gear along said first shaft to engage and mesh with said second gear.

6. In a change speed transmission, a first gear and a first shaft driven in timed relation with said first gear from a single power source, a second shaft adapted to be driven, second and third gears operatively connected to said second shaft, a gear cluster having first and second gears, one of said first and second gears of said gear cluster being continuously in mesh with said first gear, said first and second gears of said gear cluster being adapted to be selectively meshed with said second and third gears connected to said second shaft, respectively, drive means selectively operable for operatively connecting said first and second shaft to drive said second and third gears at speeds which are at a near synchronous speed with the speed of said first and second gears of said gear cluster, respectively, and control means for selectively engaging said first and second gears of said gear cluster with said second and third gears connected to said second shaft, respectively.

7. In a change speed transmission; a first gear and a first shaft driven in timed relation with said first gear from a single power source, a second shaft adapted to be driven, first and second gears operatively connected to said second shaft, a gear cluster continuously in mesh with said first gear and having first and second gears slidably carried by a third shaft extending parallel to said second shaft, said gear cluster being adapted to be shifted lengthwise of said third shaft to selectively engage said first and second gears on said second shaft, drive means selectively operable to drivingly interconnect said first shaft and said second shaft to rotate said second shaft at first and second speeds, said first gear on said second shaft having a speed which is at a near synchronous speed with the speed of said first gear of said gear cluster when said second shaft is rotated at said first speed, said second gear carried by said second shaft having a speed which is at a near synchronous speed with the speed of said gear of said gear cluster when said second shaft is rotated at said second speed, fluid operated motor means selectively actuatable to move said gear cluster to a first position to engage said first gear on said second shaft, to a second position to engage said second gear on said second shaft, and to a third position which is intermediate the first and second positions.

8. In a change speed transmission for a machine tool having a rotatable spindle, a first gear and a first shaft driven in timed relation with said first gear from a single power source, first and second gears operatively connected to said spindle, a gear cluster continuously in mesh with said first gear and having first and second gears slidably carried by a second shaft extending parallel to said spindle, said gear cluster being adapted to be shifted lengthwise of said second shaft to selectively engage said first and second gears on said spindle, drive means selectively operable to drivingly interconnect said first shaft and said spindle to rotate said spindle at first and second speeds, said first gear on said spindle having a speed which is at a near synchronous speed with the speed of first gear of said gear cluster when said spindle is rotated at said first speed, said second gear carried by said spindle having a speed which is at a near synchronous speed with the speed of said second gear of said gear of said gear cluster when said spindle is rotated at said second speed, fluid operated motor means selectively actuatable to move said gear cluster to a first position to engage said first gear on said spindle, to a second position to engage said second gear on said spindle, and to a third position which is intermediate the first and second positions.

References Cited

UNITED STATES PATENTS

| | | | |
|---|---|---|---|
| 1,903,635 | 4/1933 | Saives | 74—339 |
| 3,182,778 | 5/1965 | Droschel | 74—339 |

ROBERT M. WALKER, *Primary Examiner.*

DAVID J. WILLIAMOWSKY, *Examiner.*

H. S. LAYTON, *Assistant Examiner.*